(12) United States Patent
Olin

(10) Patent No.: US 6,702,540 B2
(45) Date of Patent: Mar. 9, 2004

(54) MACHINE AND METHOD FOR MANUFACTURING COMPACT DISCS

(75) Inventor: Stefan Olin, Hägersten (SE)

(73) Assignee: M2 Engineering AB, Kista (SE)

( * ) Notice: Subject to any disclaimer, the term of this patent is extended or adjusted under 35 U.S.C. 154(b) by 141 days.

(21) Appl. No.: 09/996,810

(22) Filed: Nov. 30, 2001

(65) Prior Publication Data

US 2002/0067978 A1 Jun. 6, 2002

Related U.S. Application Data

(63) Continuation-in-part of application No. 09/011,836, filed as application No. PCT/SE96/01542 on Nov. 26, 1996, now abandoned.

(30) Foreign Application Priority Data

Nov. 27, 1995 (SE) ............................................ 9504226

(51) Int. Cl.[7] ............................................. B65G 49/07
(52) U.S. Cl. ...................................... 414/217; 414/939
(58) Field of Search ................................ 414/217, 939

(56) References Cited

U.S. PATENT DOCUMENTS

| | | | |
|---|---|---|---|
| 4,443,147 A | 4/1984 | Richards | 414/71 |
| 4,820,106 A | 4/1989 | Walde et al. | 414/217 |
| 4,886,592 A * | 12/1989 | Anderle et al. | 204/298 |
| 4,969,790 A * | 11/1990 | Petz et al. | 414/217 |
| 5,033,927 A | 7/1991 | Pelissier | |
| 5,183,547 A | 2/1993 | Ikeda | 204/298.25 |
| 5,232,505 A * | 8/1993 | Novak et al. | 118/712 |
| 5,439,522 A | 8/1995 | Zejda | 118/500 |
| 5,467,517 A | 11/1995 | Sugito et al. | 29/407 |
| 5,470,195 A | 11/1995 | Blank et al. | 414/797 |
| 5,612,068 A | 3/1997 | Kempf et al. | 425/574 |
| 5,791,851 A | 8/1998 | Kempf et al. | 414/217 |
| 5,863,170 A * | 1/1999 | Boitnott et al. | 414/222 |
| 5,913,652 A * | 6/1999 | Zejda | 414/225 |

FOREIGN PATENT DOCUMENTS

| | | |
|---|---|---|
| DE | 36 29 045 | 3/1988 |
| DE | 37 20 525 | 12/1988 |
| DE | 42 35 676 | 6/1994 |
| EP | 0 574 975 | 12/1993 |
| EP | 0 860259 * | 8/1998 |

* cited by examiner

Primary Examiner—Steven A. Bratlie
(74) Attorney, Agent, or Firm—Jacobson Holman PLLC

(57) ABSTRACT

A compact disc manufacturing machine carrying out a plurality of manufacturing stages including a vacuum stage. A central manipulator has a plurality of radially and outwardly extending manipulator arms which move the discs successively into program-determined working locations necessary for carrying out successively the manufacturing process. The vacuum chamber houses a multi-arm inner manipulator. The disk is moved to and from the vacuum chamber through a vacuum sluice having upper, intermediate and lower parts. The lower part is mounted on an outer end of an arm of the internal manipulator, and the upper part is affixed to an outer end of one of the arms of the central manipulator. When a disk is to be introduced into the vacuum chamber, the arm of the central manipulator delivers the disk into the intermediate part, and the upper part is positioned by the arm over the intermediate part. The internal manipulator positions the lower part beneath the intermediate part, whereby the disk is received by the lower sluice part of the internal manipulator. This co-action of the manipulators with the vacuum sluice to operate it, and to transfer a disk through the vacuum sluice into and out of the vacuum chamber, represents a significant improvement in compact disk manufacture.

10 Claims, 9 Drawing Sheets

MACHINE AND METHOD FOR MANUFACTURING COMPACT DISCS

This application is a continuation-in-part application of U.S. Ser. No. 09/011,836, filed May 27, 1998 now abandoned which is a 371 national stage of PCT/SE96/01542 filed Nov. 26, 1996.

FIELD OF INVENTION

The present invention relates to a machine and method for manufacturing compact discs. More specifically, the invention relates to a machine for carrying out a plurality of manufacturing stages included in a complete manufacturing process.

DESCRIPTION OF THE RELATED ART

Commercially available systems for the manufacture of compact discs comprise a number of different solutions, all of which are based on either commercially available OEM components with incorporated standard solutions, or are based on customized solutions that often include several separate pneumatic functions, manipulators or one or two industrial robots.

Systems having a plurality of separate pneumatic functions, manipulators or industrial robots engender large investment costs, increased maintenance requirements, multiple fault and error sources, and difficult defect checking work, and further necessitate the storage of large numbers of spare parts. The object of the present invention is to eliminate these drawbacks.

SUMMARY OF THE INVENTION

A machine of the aforesaid kind includes a central manipulator having a plurality of radially and outwardly extending manipulator arms. The manipulator is constructed to carry out reciprocating rotary movements in a first plane and lifting and lowering movements in a second plane that is perpendicular to the first plane, in accordance with a predetermined program that controls the manufacturing process. The manipulator arms are intended to move discs successively from position to position into program determined specific working locations required for carrying out the manufacturing stages of the manufacturing process.

According to the invention, the central manipulator is intended to coact with an internal manipulator mounted in a vacuum chamber through the medium of one of the manipulator arms, for carrying out a vacuum-requiring manufacturing stage in the full manufacturing process.

BRIEF DESCRIPTION OF THE DRAWINGS

The invention will now be described in more detail with reference to the accompanying schematic drawings, in which.

DETAILED DESCRIPTION OF THE PREFERRED EMBODIMENTS

Figure 1:
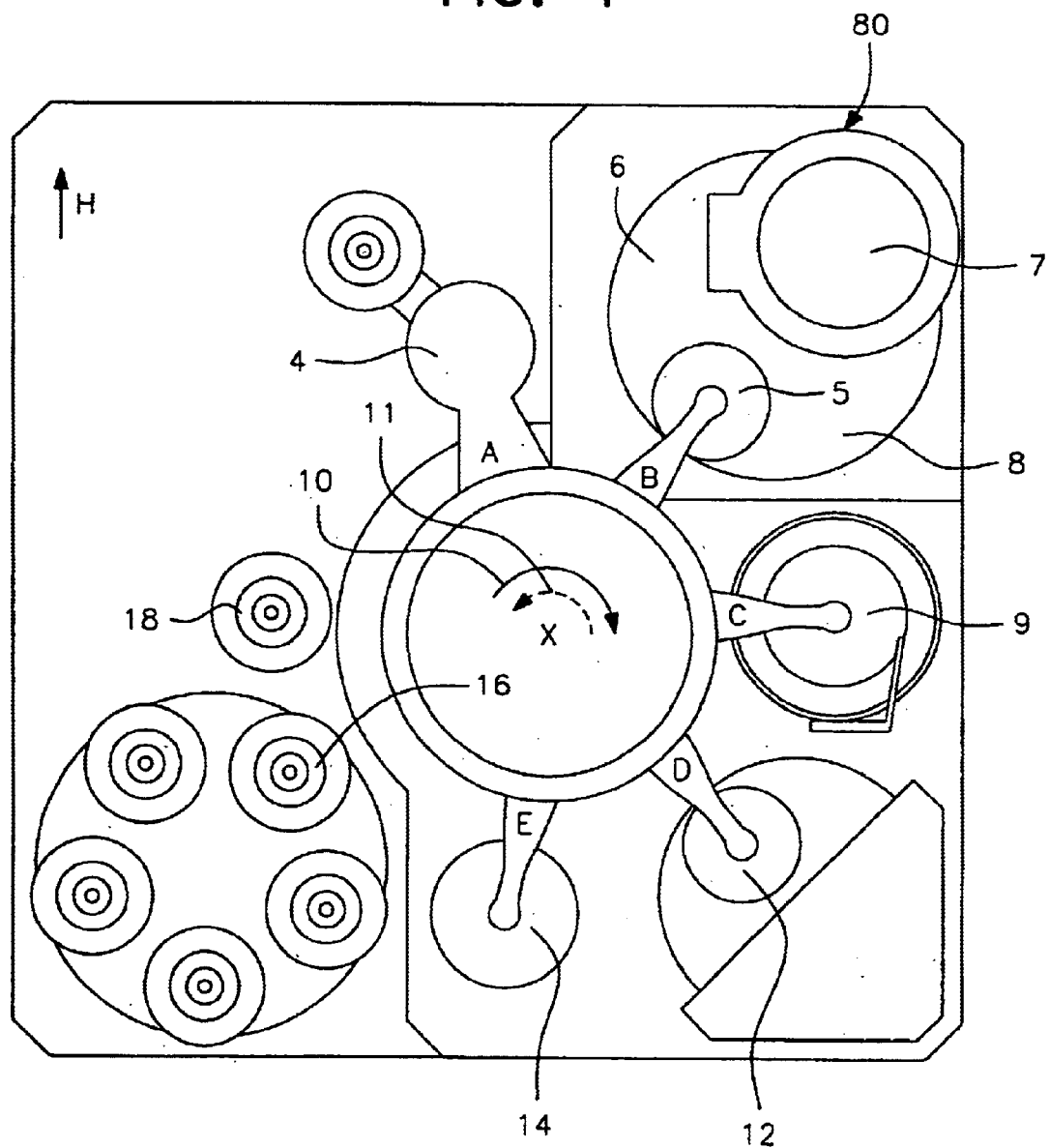
FIG. 1 illustrates a top view of a machine for manufacturing compact discs in accordance with the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description FIG. 1 illustrates a central manipulator X that includes a plurality of radially and outwardly extending manipulator arms A, B, C, D, E. All of the arms A–E have gripping elements, such as suction cups, and are located in a common plane which is normal to the rotational axis of the central manipulator. The gripping elements move along a circle which is coaxial with the rotational axis of the manipulator X. The central manipulator is constructed to perform forward (clockwise) and backward (counter-clockwise) rotary movements, see the full arrow 10 and broken arrow 11 respectively, in a first plane h (horizontal) and lifting and lowering movements in a second plane v (vertical) perpendicular to the first plane in accordance with a predetermined program that controls a compact disc manufacturing process. Mechanisms for carrying out reciprocating rotary movements as well as lifting and lowering movements using a drive mechanism 340 are known in the art, with U.S. Pat. No. 4,443,147 being one example.

The manipulator arms A–E are constructed to move discs successively from respective positions to respective program-determined working locations necessary for carrying out successively the manufacturing stages of the working process. The various positions are referenced 4, 5, 6, 7, 8, 9, 12, 14, 16 and 18. Some of the manufacturing stages will now be described.

Figure 2:
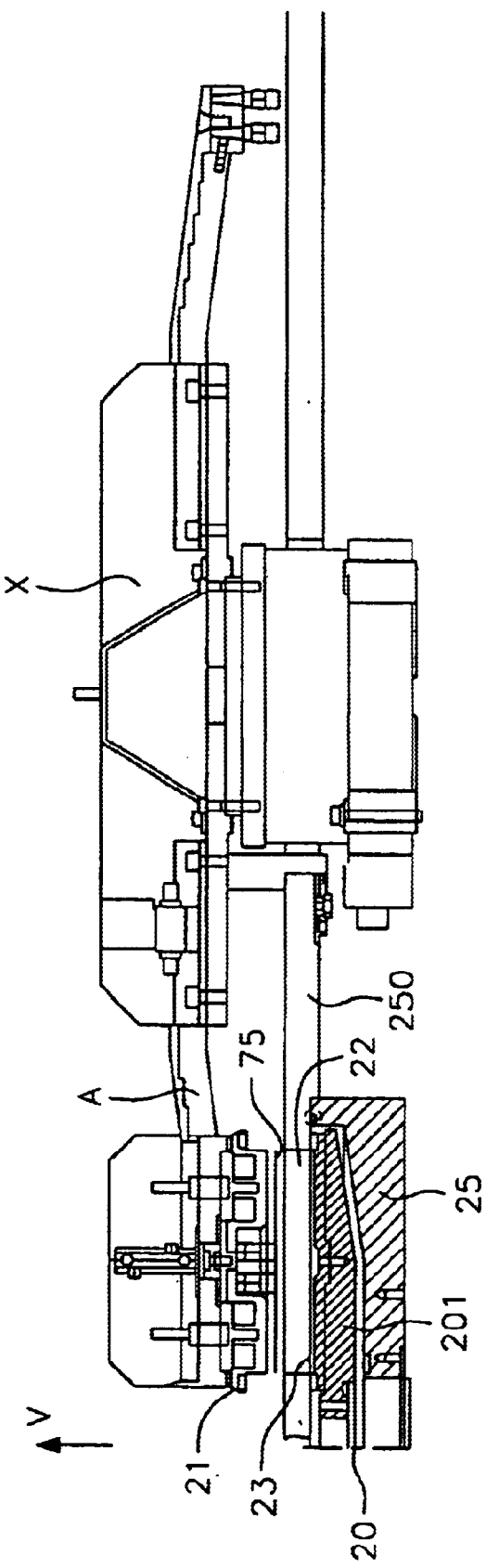
FIG. 2 is a sectional side view of a part of a metallizer assembly with manipulator arm and vacuum sluice included in the machine shown in FIG. 1.

The manipulator arm A located in position 4 in FIG. 1 is indexed to position 5, wherewith a CD-blank is moved from position 4 to position 5 of the metallizer assembly 80 with the aid of suction cups and deposited in said position 5. In position 5, the arm also has a function in which it coacts with a vacuum sluice 21-22-23 leading to a vacuum chamber 25 of metallizer 80, which will be described in more detail with reference to FIGS. 2–4.

Figure 5A:
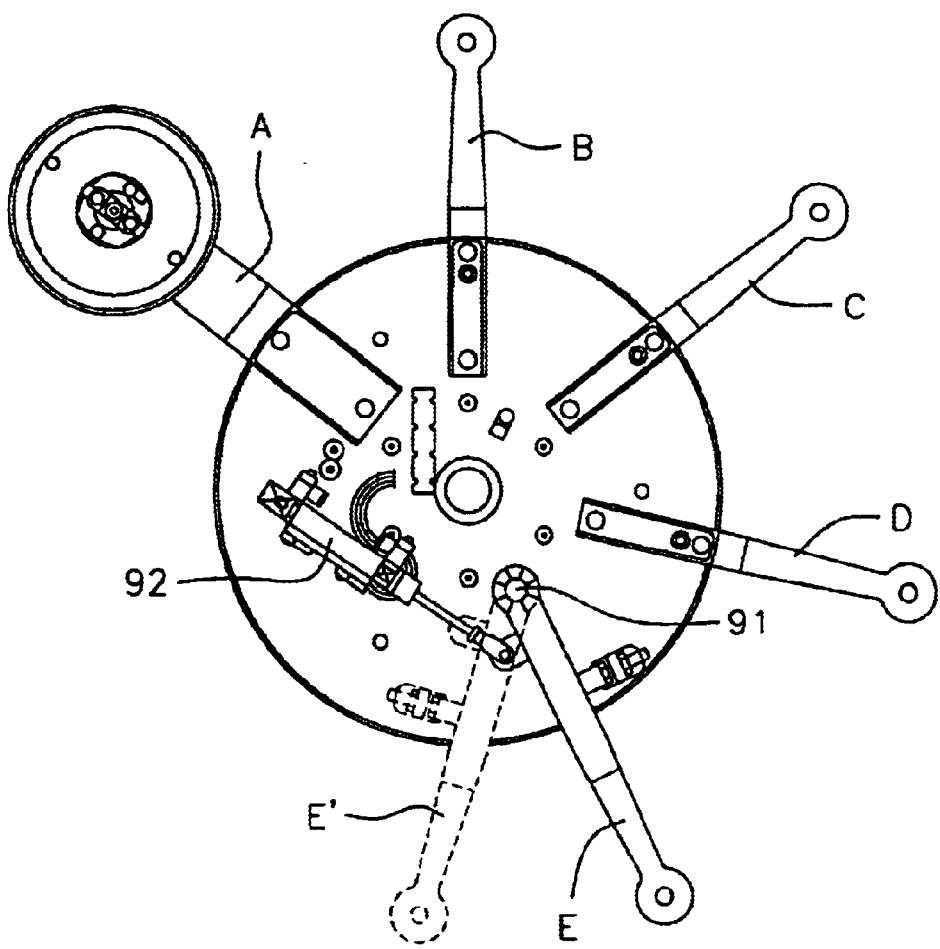
FIG. 5A is a top view of the central manipulator assembly of FIG. 1.
Figure 5B:
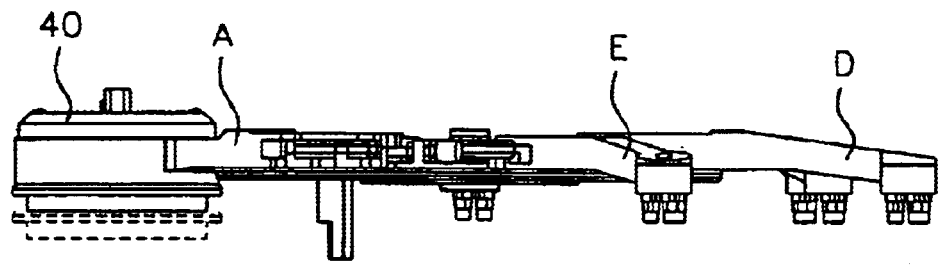
FIG. 5B is a side view of the central manipulator assembly of FIG. 5A.
Figure 6:
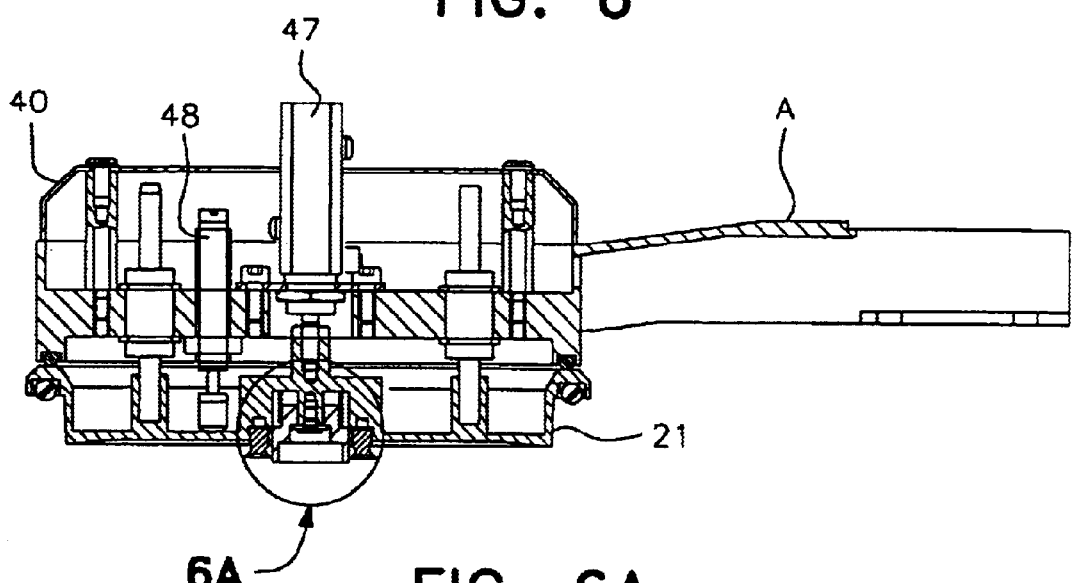
FIG. 6 is an enhanced cross-sectional view of arm A with lid structure of FIG. 2.
Figure 6A:
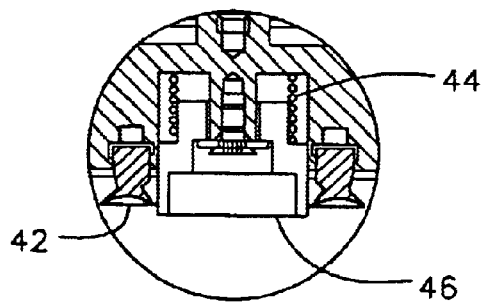
FIG. 6A is an enlargement of view A of FIG. 6.
Figure 7:
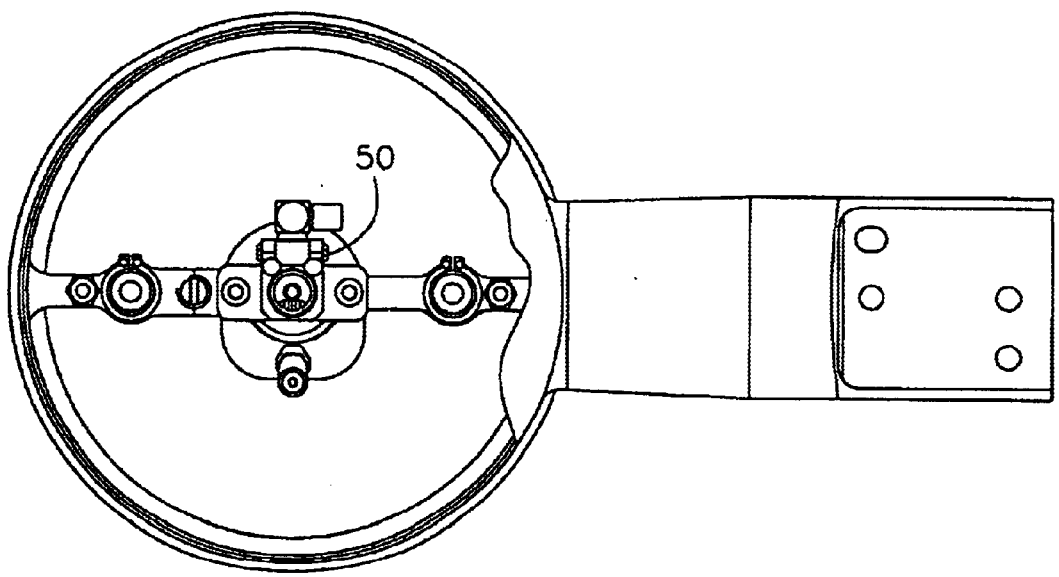
FIG. 7 is a top view of arm A of FIG. 6.
Figure 8:
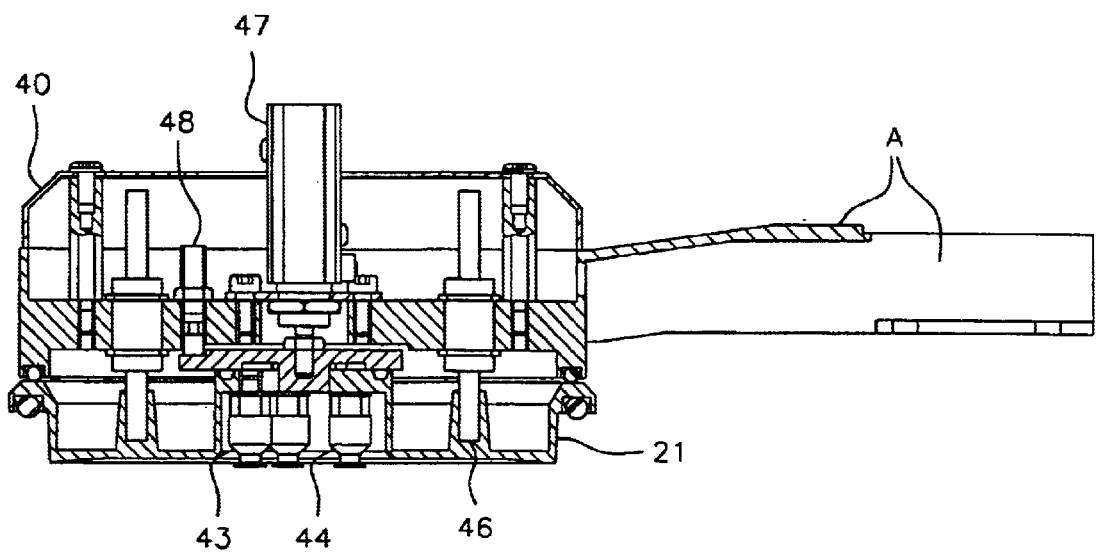
FIG. 8 is an alternative cross-sectional view of arm A with lid structure of FIG. 6.
Figure 9:
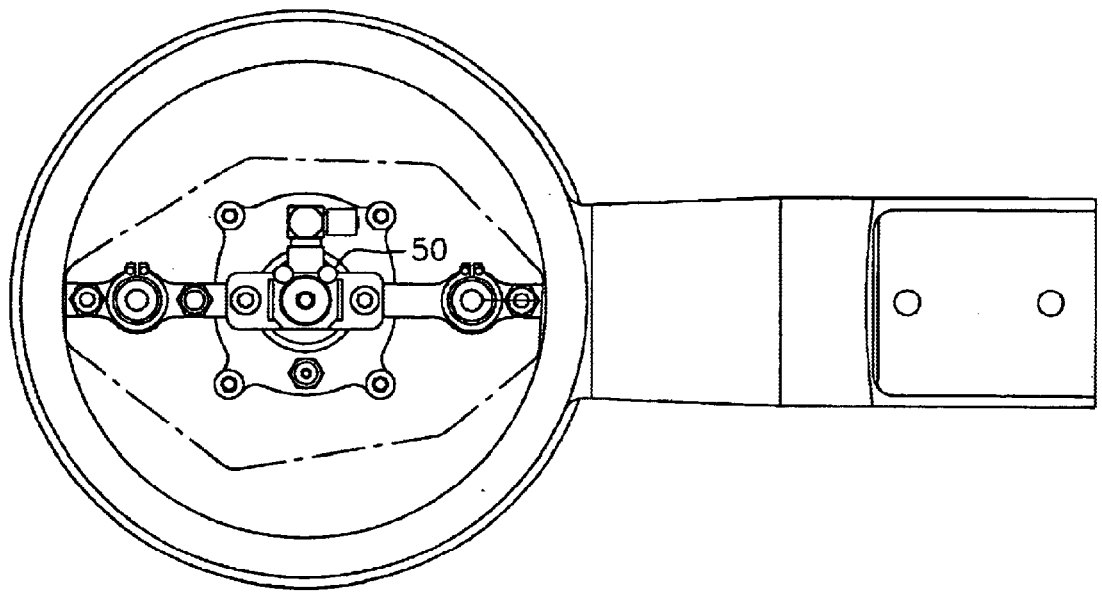
FIG. 9 is a top view of the alternative cross-sectional view of FIG. 8.

As the arm A is moved from position 4 to position 5, the arm B is moved from position 5 to position 9 while carrying an aluminum coated disc. Concurrently, the arm C is moved from position 9 to position 12, while carrying an aluminium coated disc that has a protective lacquer layer over the aluminium coating. The arm D is moved from position 12 to position 14 while carrying a disc that has been hardened, or cured, with strong ultraviolet light in position 12, and the arm E moves from position 14 to position 16 while carrying a disc that has been checked in position 14 with respect to faults, errors, damage and/or cosmetic defects. The disc has herewith been found acceptable. If, on the other hand, the disc has been found unacceptable, the arm E is swung out to position 18 around axis 91 with the aid of a pneumatic piston-cylinder device 92 mounted on the central manipulator X, as shown in FIGS. 5A and 5B.

As will be evident from FIGS. 2 and 6–9, the outer end of the manipulator arm A includes a permanently mounted upper part 21 of a vacuum sluice 21-22-23 and is adapted to position the upper part or upper lid 21 onto an intermediate part 22 of the vacuum sluice at position 5 wherein, subsequent to being lowered, said intermediate part forms an integral part of a chamber lid 250 of the vacuum chamber 25. The upper lid 21, which is fixed to the arm A, can move to such an axial position that it seals the upper open end of the stationary intermediate part 22 forming the sluice chamber, when the central manipulator X has arrived to its lowermost axial position. Following a coating treatment under vacuum in the metallizer, the lid 21 may thereafter be lifted with the arm A and rotated back to position 4. The upper lid 21 also carries gripping means, such as suction cups 43 or a suction ring 42, by which an object, such as a disk 75, can be brought into the sluice chamber and then transferred to disk-receiving means on the lower lid 23.

Figure 4:
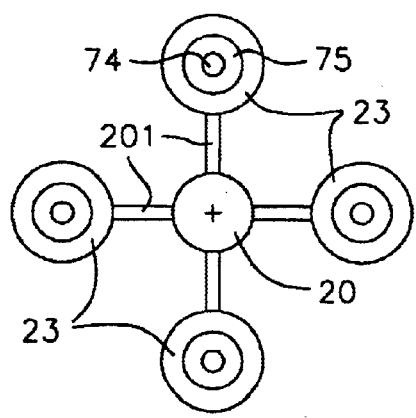
FIG. 4 is a sectional view taken along line IV—IV of FIG. 3 showing the lower lid structure of the internal manipulator.

The sluice chamber 22 is formed by a through-going hole in the lid of the vacuum treatment chamber 25 in which there is an internal manipulator 20 for carrying out a vacuum-requiring manufacturing stage in the full manufacturing process, in this case a coating treatment by metallizer 80. As shown in FIG. 4, the internal manipulator 20 has four arms 201. An outer end of each arm 201 is provided with a lower part 23 which is fixed to the arm 201. The lower part 23, which receives a CD 75 from the arm A, is movable relative to the sluice 22, moving as a unit with the arm 201 of the internal manipulator to which it is fixed. The lower part 23 serves as the lower lid of the sluice chamber 22.

The internal manipulator 20 is rotatable around an axis which is parallel to the rotational axis of the central manipulator. The internal manipulator 20 is also displaceable up and down along its rotational axis, and the arms 201 of the internal manipulator 20 have equal mutual angular distances in relation to the rotational axis of the internal manipulator. The drive mechanism 204 acts to rotate the manipulator to bring a lower lid 23 to sealingly cover the lower end of the sluice chamber 22.

There are conventional pump means 55 connected to the vacuum sluice and to the vacuum working chamber 25. When, for example, the lower lid 23 seals the lower end of the sluice chamber 22, and thereafter the upper lid 21 is brought by the central manipulator to seal the upper end of the sluice 22, the pump means acts to evacuate the sluice to a pressure equal to the vacuum within the chamber 25.

Thereafter, the manipulator 20 is lowered so that the manipulator 20 can be indexed one step, and then the next lid 23, which carries a ready-treated object/disc, is aligned with the sluice. The drive mechanism 204 moves the aligned lid 23 up to again seal the lower end of the vacuum chamber 22, after which the arm A with the upper lid 21 can be lifted, following pressurization of the sluice to atmospheric pressure.

Thereafter, arm A with its lid 21 moves back to position 4. At the same time, arm B is returned to position 5. Manipulator X is then lowered, allowing the grippers of arm A to pick up a new disc in position 4, and the grippers on arm B to grip the ready-treated disc on lid 23. The central manipulator X is then lifted and indexed forwardly 10. There is a sputtering device 240 in chamber 25 by which the CD-disc is provided with a metal coating. The sputtering station and the sluice position are 180 degrees apart. Between these two stations there are a pair of waiting stations. The operation of the central and internal manipulators are synchronized to permit the foregoing operation.

As just described, the internal manipulator 20 carries a number of lower lids 23 for the lower end of the sluice 22, and the central manipulator has one arm A which carries the upper lid 21 of the sluice. The sluice lids 21, 23 are brought to and from engagement with the sluice chamber 22 by the action of the axially and rotationally movable manipulators X, 20, respectively.

The gripping elements of all the arms A–E are located in a common plane which is parallel to a support level for the CD-discs in all stations 4, 5, 9, 12, 14, 16, 18. The stations are located at equal mutual angular distances in relation to the rotational axis of the manipulator X. Moreover, the central manipulator X is vertically movable over a distance which permits an arm gripper to engage a CD-disc in its support position and lift it to a level at which the CD-disc can be indexed to the next rotational position, where it can then be laid down.

With the aid of the system of valves for vacuum pumping and increasing the pressure in the vacuum sluice 21-22-23, the arm A delivers a disc to the intermediate part 22, the arm 201 captures and transports the disc to a waiting station in position 6 in the chamber 25 and thereafter to a position 7 for coating with aluminium by cathode sputtering using sputtering device 240. Upon completion of the coating, the arm 201 moves the disk to a waiting station 8 and finally back to position 5, where the arm B is now located and takes the disc to position 9.

As already indicated, in addition to participating in the rotary movement of the central manipulator X in one direction to a given position, namely position 16, one of the arms of the central manipulator X, namely arm E, also performs an individual rotary movement to a subsequent position 18, provided that the program delivers a separate impulse that indicates that the disc in question has not been found acceptable in the check carried out in position 14. Arm E is joined to pivot around the axis 91 which is parallel with the rotational axis of central manipulator X, to pivot in the plane of FIG. 1. To this end, drive cylinder 92 acts between the manipulator head and the arm E at a distance from the pivot axis 91, whereby arm E can swing away from and back to its normal position in relation to the manipulator head.

Figure 3:
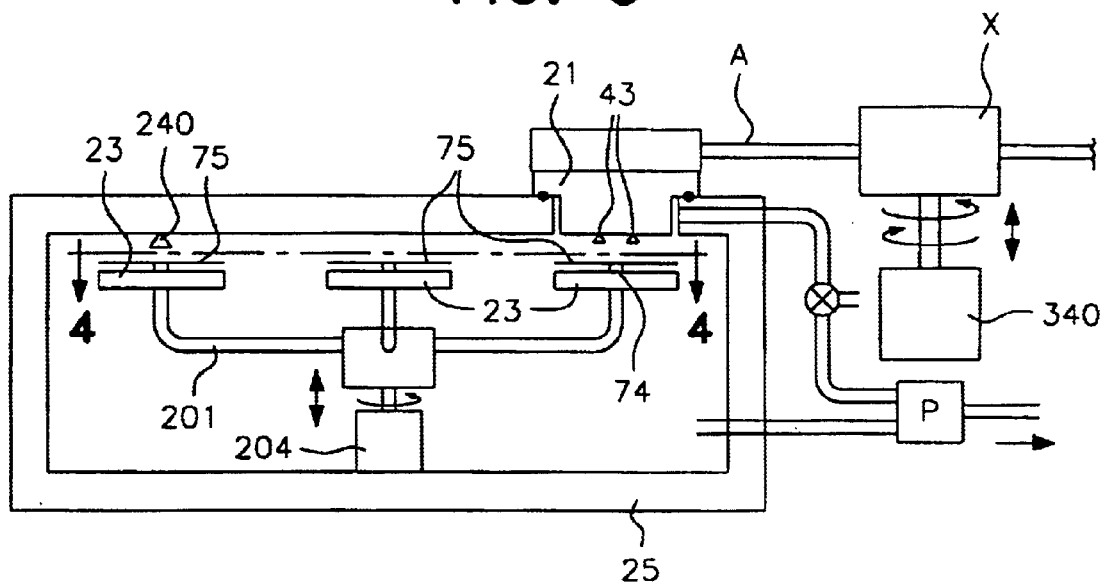
FIG. 3 is a block diagram illustrating the vacuum treatment chamber 25 of the metallizer as operating with the lid structure carried by arm A on manipulator X of FIG. 1.

FIG. 3 shows schematically the vacuum treatment chamber 25 as operating with the lid structure 21 carried by arm A on manipulator X. As shown, a disk 75, held by suction cups 43 to the upper lid 21, is deposited on one of the lower lids 23 fixedly carried on a respective one of the arms 201 of the internal manipulator 20. A projecting portion 74 extending from each of the arms 201 passes through the open center portion of the disk 75. Drive mechanism 204 rotates and moves the internal manipulator up and down as necessary to reach position 7 where the disk is treated by the sputtering device 240, after which the manipulator rotates to realign the treated disk with the sluice at position 5. A sectional view along line IV—IV of FIG. 3 is shown in FIG. 4.

FIGS. 5A and 5B depict top and side views of the central manipulator assembly, respectively. As shown in FIG. 5A, pneumatic piston 92 rotates arm E from position E to E' in response to detecting a defect in the disk.

FIGS. 6, 6A, 7, 8 and 9 present various views of the outer end of the manipulator arm A with the upper lid 21 of the vacuum sluice 21-22-23, cylinder 47, shock absorber 48 and cover 40. A disk holder 46 with suction ring 42 or suction cups 43 serves to hold the disk, with spring 44 providing resilience. An inductive sensor 50 is used to verify the position of the cylinder 47.

Figure 10:
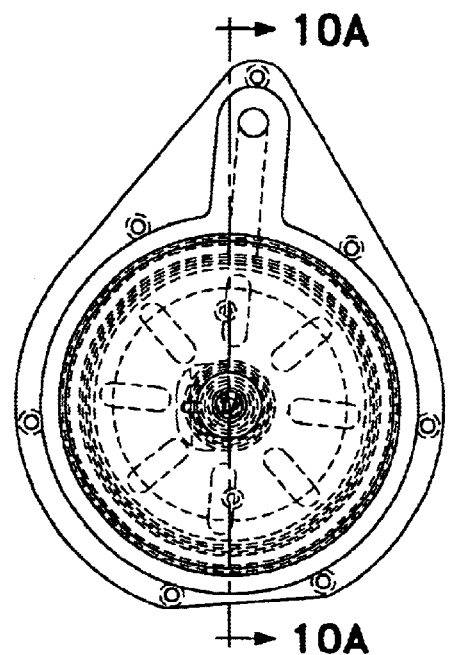
FIG. 10 is a top view of chamber lid structure of the metallizer of FIG. 2.
Figure 10A:
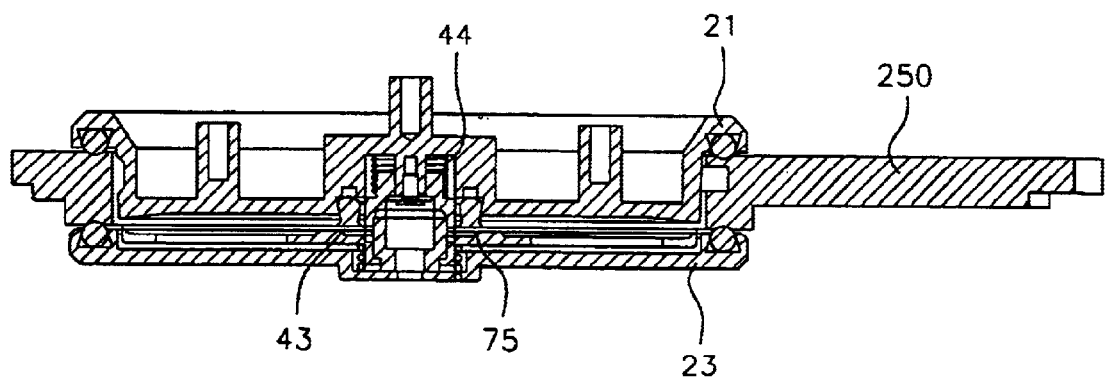
FIG. 10A is a cross-sectional view taken along line A—A of FIG. 10.
Figure 11A:
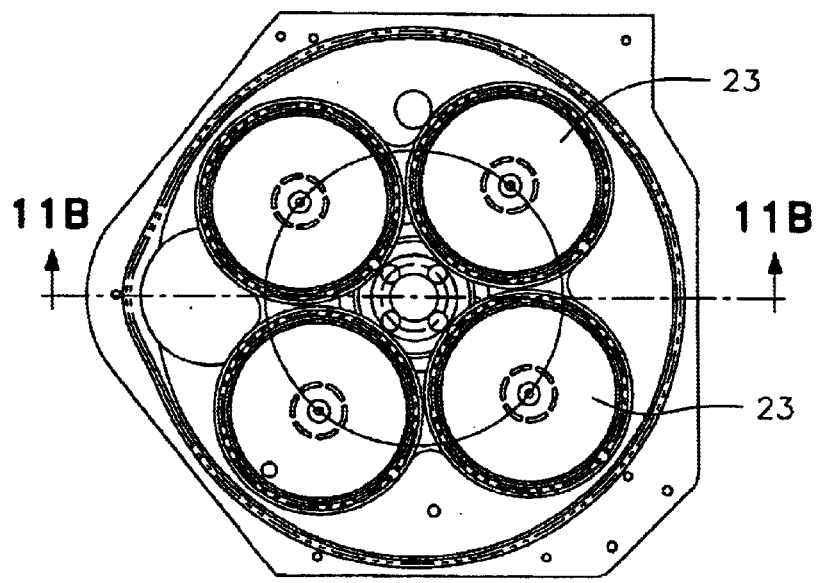
FIG. 11A is a top view of the metallizer lower assembly of FIG. 4.
Figure 11B:
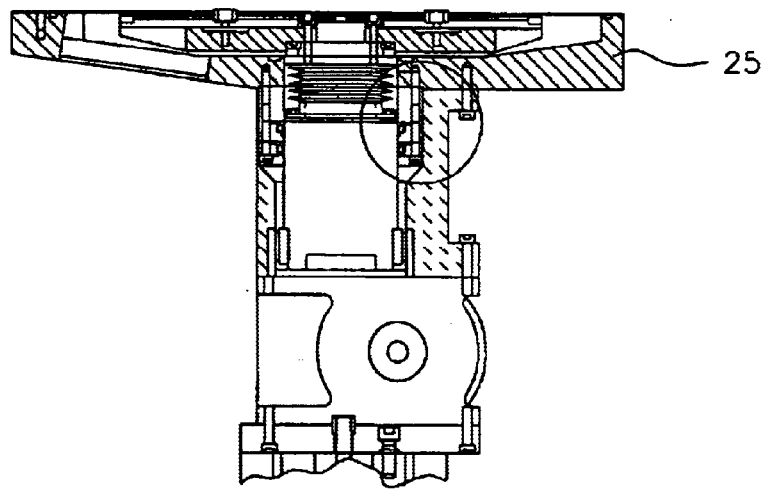
FIG. 11B is a cross-sectional view taken along line B—B of FIG. 11A.
Figure 11C:
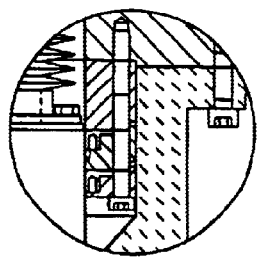
FIG. 11C is an enlarged view of the circled portion of FIG. 11B.
Figure 12:
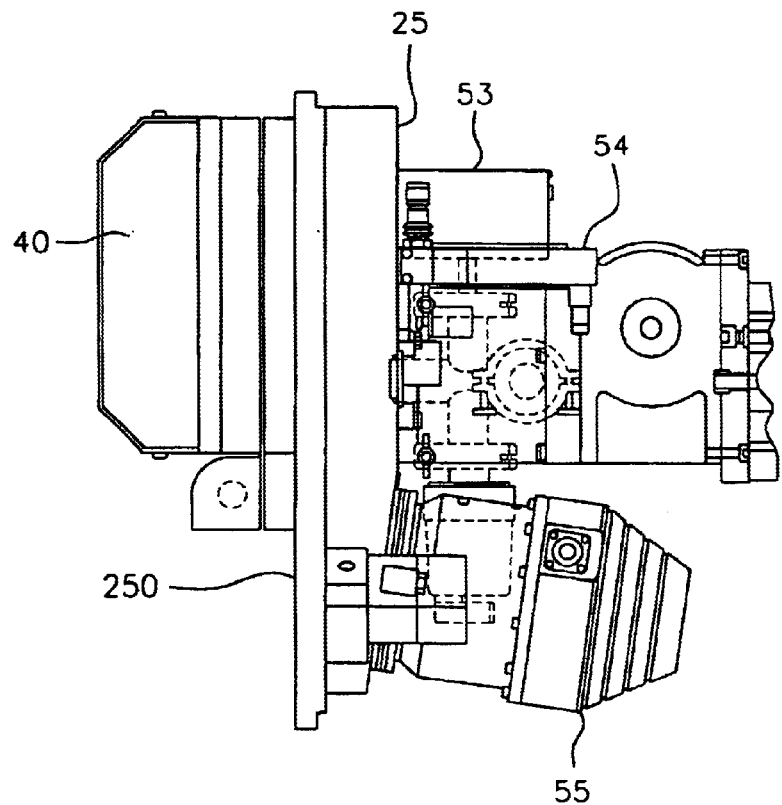
FIG. 12 is a side view of the metallizer assembly in accordance with the present invention.
Figure 13:
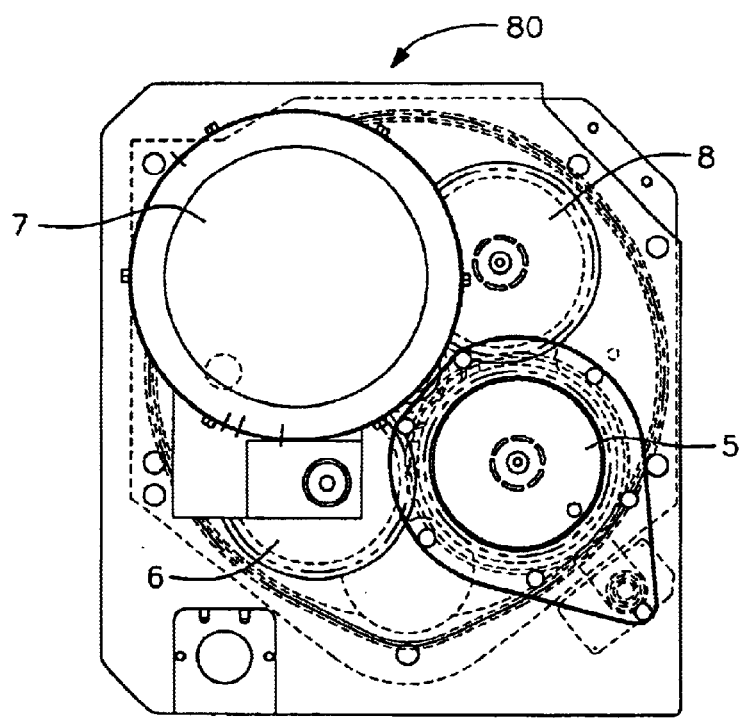
FIG. 13 is a top view of the metallizer assembly of FIG. 12.

FIGS. 10 and 10A are top and sectional views, respectively, of the chamber lid structure of the metallizer of FIG. 2, and FIGS. 11A–C illustrate various views of the metallizer lower assembly which includes manipulator 20 and arms 201. The metallizer assembly with vacuum gauge assembly 53, Argon gas inlet 54 and turbo pump 55 is depicted in FIG. 12; FIG. 13 is a top view of the metallizer of FIG. 12. The vacuum gauge assembly serves to verify the vacuum level in the metallizer assembly. During operation of the metallizer, a small flow of argon is continuously admitted into the metallizer chamber via the argon inlet 54 and an argon flow regulator. The vacuum pump 55 works continuously to maintain a certain vacuum level in the metallizer chamber, during the operation of the metallizer. As an example, the vacuum pump establishes a vacuum of $10^{-4}$ in the absence of argon supply, and the vacuum of $10^{-3}$ bar with argon supply. The vacuum gauge can thereby verify that a correct flow of argon is admitted into the metallizer chamber during operation thereof.

As set forth above, the machine for manufacturing compact disks according to the present invention has a central manipulator with a plurality of arms, and an internal manipulator located in a vacuum chamber 25 in which one of the manufacturing steps is performed. The disk is moved to and from the vacuum chamber through a vacuum sluice having upper, intermediate and lower parts. The outer end of each arm of the internal manipulator 20 includes the lower part 23, and the outer end of one of the arms of the central manipulator includes the upper part 21. When a disk is to be introduced into the vacuum chamber, the arm of the central manipulator delivers the disk into the intermediate part 22, and positions the upper over the intermediate part. The upper part then becomes an integral part of the chamber lid 250. The internal manipulator positions one of the lower parts beneath the intermediate part, whereby the disk is received by the lower sluice part of the internal manipulator. The internal manipulator then rotates to carry the disk to the sputtering device for treatment, and then back to the vacuum sluice where the disk is picked up by arm B and moved by the central manipulator X to the next position 9. This co-action of the manipulators with the vacuum sluice to operate it, and to transfer a disk through the vacuum sluice into and out of the vacuum chamber, represents a significant improvement in compact disk manufacture.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A machine for manufacturing compact discs comprising:

a central manipulator having a plurality of outwardly and radially extending manipulator arms for moving compact discs through manufacturing stages, said central manipulator adapted to carry out reciprocating rotary movements in a first plane and lifting and lowering movements in a second plane perpendicular to the first plane;

a vacuum sluice having an upper part, an intermediate part and a lower part, said upper part permanently affixed to an outer end of a first manipulator arm of said plurality of manipulator arms; and a vacuum chamber housing an inner manipulator and having a chamber lid, said intermediate part of said vacuum sluice forming an integral part of the chamber lid, an arm of said inner manipulator having the lower part of said vacuum sluice affixed thereto, wherein said first manipulator arm, through rotary and lowering movement, deposits a compact disc into said intermediate part and positions said upper part onto said intermediate part, and said arm of said inner manipulator positions said lower part beneath said intermediate part to receive said compact disc, said vacuum chamber carrying out a vacuum-requiring manufacturing stage of compact disc manufacture.

2. The machine as set forth in claim 1, wherein said first manipulator arm, through lifting and rotary movement, captures and transports said compact disc to a subsequent stage of compact disc manufacture.

3. A machine for manufacturing compact discs comprising:

a central manipulator having a plurality of outwardly and radially extending manipulator arms for moving compact discs through manufacturing stages, a first manipulator arm having at an outer end thereof an upper lid part with a gripping element for holding a compact disc;

a vacuum chamber having a chamber lid with a vacuum sluice formed as an integral part of said chamber lid, said upper lid part forming an upper sealing part of said vacuum sluice;

an inner manipulator with a plurality of arms housed within said vacuum chamber for moving compact discs through stages within said vacuum chamber, an arm of said inner manipulator having affixed thereto a lower lid part forming a lower sealing part of said vacuum sluice, wherein said first manipulator arm, through rotary and lowering movement, deposits a compact disc into said vacuum sluice and positions said upper lid part sealingly onto said vacuum sluice, and said arm of said inner manipulator rotates to position said lower lid part sealingly beneath said vacuum sluice to receive said compact disc, said sluice when sealed being evacuated to a pressure equivalent to a pressure of said vacuum chamber and thereafter said vacuum chamber carrying out a vacuum-requiring manufacturing stage of compact disc manufacture.

4. The machine as set forth in claim 3, wherein said arm of said inner manipulator rotates to return said disc to said vacuum sluice upon completion of said vacuum-requiring manufacturing stage, said sluice being pressurized to atmospheric pressure and then said first manipulator arm, with said gripping element on said upper lid part, through lifting and rotary movement, capturing and transporting said compact disc to a subsequent stage of compact disc manufacture.

5. The machine as set forth in claim 3, wherein said gripping element is a suction cup.

6. The machine as set forth in claim 3, wherein said gripping element is a suction ring.

7. The machine as set forth in claim 3, wherein said vacuum chamber includes a sputtering device for coating said compact disc.

8. The machine as set forth in claim 7, wherein said inner manipulator includes four arms spaced at equal angular distances from one another, said vacuum sluice and said sputtering device positioned 180 degrees from one another relative to an axis of rotation of said inner manipulator.

9. The machine as set forth in claim 8, wherein each of said four arms includes a lower lid part for receiving a disc.

10. A method for manufacturing compact discs with a machine including a central manipulator having a plurality of outwardly and radially extending manipulator arms for moving compact discs through manufacturing stages, a first manipulator arm having at an outer end thereof an upper lid part with a gripping element for holding a compact disc, and a vacuum chamber including an inner manipulator with a plurality of arms housed within said vacuum chamber for moving compact discs through stages within said vacuum chamber, at least one of said plurality of arms having a lower lid part affixed thereto, said vacuum chamber further having a chamber lid with a vacuum sluice formed as an integral part of said chamber lid, said method comprising the steps of:

rotating in a first direction said first manipulator arm into alignment with and above said vacuum sluice;

lowering said first manipulator arm and sealing an upper part of said vacuum sluice with said upper lid part;

rotating said inner manipulator to align said arm with and under said vacuum sluice;

raising said arm and sealing a lower part of said vacuum sluice with said lower lid part;

evacuating said vacuum sluice to a pressure equivalent to a pressure in said vacuum chamber;

lowering said arm with said lower lid part, said disc held on said lower lid part;

rotating said inner manipulator to bring said disc to a sputtering device within said vacuum chamber for coating and, upon completion of said coating, rotating said inner manipulator to bring said coated disc back to said vacuum sluice;

raising said arm with said lower lid part and coated disc thereon and sealing said lower part of said sluice with said lower lid part;

pressurizing said sluice to atmospheric pressure;

lifting and rotating said first manipulator arm in a second direction to capture a next disc and, concurrently, rotating a second manipulator arm in said second direction to capture the coated disc on said lower lid part;

rotating said first manipulator arm with said next disc in said first direction, into alignment with and above said vacuum sluice and, concurrently, rotating said second manipulator arm in said first direction to bring said coated disc to a subsequent stage of compact disc manufacture.

* * * * *